United States Patent
Kvaløy

(10) Patent No.: US 11,930,330 B2
(45) Date of Patent: Mar. 12, 2024

(54) SYSTEM FOR MONITORING SOUND

(71) Applicant: MINUENDO AS, Oslo (NO)

(72) Inventor: Olav Kvaløy, Oslo (NO)

(73) Assignee: MINUENDO AS, Oslo (NO)

(*) Notice: Subject to any disclaimer, the term of this patent is extended or adjusted under 35 U.S.C. 154(b) by 211 days.

(21) Appl. No.: 17/416,816

(22) PCT Filed: Dec. 20, 2019

(86) PCT No.: PCT/GB2019/053673
§ 371 (c)(1),
(2) Date: Jun. 21, 2021

(87) PCT Pub. No.: WO2020/128521
PCT Pub. Date: Jun. 25, 2020

(65) Prior Publication Data
US 2022/0201415 A1   Jun. 23, 2022

(30) Foreign Application Priority Data
Dec. 21, 2018  (GB) ..................... 1821048

(51) Int. Cl.
*H04R 29/00*   (2006.01)
*H04R 1/10*    (2006.01)
*H04R 3/00*    (2006.01)

(52) U.S. Cl.
CPC ......... *H04R 29/004* (2013.01); *H04R 1/1016* (2013.01); *H04R 3/005* (2013.01)

(58) Field of Classification Search
CPC ..... H04R 29/004; H04R 1/1016; H04R 3/005
USPC ..................................... 381/58, 74
See application file for complete search history.

(56) References Cited

U.S. PATENT DOCUMENTS

| | | | |
|---|---|---|---|
| 2007/0214893 A1* | 9/2007 | Killion | H04R 3/00 |
| | | | 702/191 |
| 2009/0259865 A1 | 10/2009 | Sheynblat et al. | |
| 2010/0278350 A1* | 11/2010 | Rung | H04R 1/10 |
| | | | 381/59 |
| 2013/0223635 A1 | 8/2013 | Singer et al. | |
| 2014/0156269 A1 | 6/2014 | Lee et al. | |
| 2015/0134331 A1 | 5/2015 | Millet et al. | |

(Continued)

OTHER PUBLICATIONS

Tung Chew et al "Using the VM1010 Wake-On-Sound Microphone and Zero Power Listening TM Technology", Nov. 2013 (Year: 2013).*

(Continued)

*Primary Examiner* — Ammar T Hamid
(74) *Attorney, Agent, or Firm* — Heslin Rothenberg Farley & Mesiti P.C.; George S. Blasiak

(57) ABSTRACT

A system for monitoring sound comprising a primary circuit portion and a secondary circuit portion. The primary circuit portion is adapted to alternate between a first state of operation and a second state of operation. In the first state, the primary circuit portion is adapted to monitor sound. The primary circuit portion is adapted to periodically enter the first state with a predetermined frequency. The secondary circuit portion is adapted to monitor sound while the primary circuit portion is in the second state and provide an indication of the sound monitored to the primary circuit portion. The system is adapted to dynamically adjust the frequency with which the primary circuit portion enters the first state based on the indication.

20 Claims, 4 Drawing Sheets

100

(56) References Cited

U.S. PATENT DOCUMENTS

2015/0223000 A1\* 8/2015 Bran .................. G01H 3/14
   381/58
2016/0105162 A1 4/2016 Zangi et al.
2016/0255014 A1 9/2016 Shmidt

OTHER PUBLICATIONS

Chew, T., et., "Using the VM1010 Wake-on-Sound Microphone and Zero Power Listening™ Technology", VESPER, Rev. 4, Nov. 2018, 13 pgs.

\* cited by examiner

SYSTEM FOR MONITORING SOUND

CROSS REFERENCE TO RELATED APPLICATIONS

This application is a national stage filing under section 371 of International Application No. PCT/GB2019/053673 filed on Dec. 20, 2019, and published on Jun. 25, 2020 as WO2020/128521 A1, which claims priority to Great Britain Application No. 1821048.4 filed on Dec. 21, 2018. The entire contents of WO2020/128521 A1 are hereby incorporated herein by reference.

This invention relates to a system for monitoring sound.

Many applications require the monitoring of a sound environment. A particular example is the monitoring of a person's exposure to noise. This is because exposure to noise is known to be a contributing factor to a number of health-related conditions and hearing loss in particular. Monitoring of a person's exposure to noise is generally useful in ensuring that this exposure stays within healthy and safe limits.

Known systems for monitoring sound have a microphone connected to a microcontroller. In such designs, an analogue-to-digital converter (ADC) will sample and digitize the sound captured by the microphone at a specified sampling rate and the microcontroller will process the digital signal to determine its properties or perform any calculations that may be required.

Often the properties of a sound environment will have a certain repeatability that can be exploited to avoid taking continuous measurements and to take periodic measurements of the sound instead. In a theoretical absolutely systematic and stable environment such an approach would not lead to any lack of accuracy. The unpredictability of real-life situations however will make such an approach inaccurate to some extent. To increase the accuracy, the frequency with which measurements are taken must be increased.

In such designs, there is a fundamental trade-off between accuracy of monitoring and overall cost of operation of the system (e.g. power). Increasing the frequency of measurements in such designs will generally improve the overall accuracy of monitoring, but will also increase the resource utilisation in the system. Conversely, decreasing the measurement frequency will decrease the resource utilisation at the cost of reducing the accuracy with which the sound is monitored.

For some situations (such as when the sound environment to be monitored is very predictable or well-defined), it may be possible to find fixed monitoring conditions that strike an adequate balance between resource utilisation and accuracy.

However, many real-life sound monitoring situations occur in environments which are complex or unpredictable or which have sound characteristics that vary significantly over time. The applicant has appreciated therefore that in such situations, fixed monitoring conditions may not be optimal in terms of the trade-off between accuracy and power consumption.

When viewed from a first aspect the present invention provides a system for monitoring sound, comprising a primary circuit portion, and a secondary circuit portion, wherein the primary circuit portion is adapted to alternate between a first state of operation and a second state of operation, wherein, in the first state, the primary circuit portion is adapted to monitor sound, and wherein the primary circuit portion is adapted to periodically enter the first state with a predetermined frequency, further wherein the secondary circuit portion is adapted to monitor sound while the primary circuit portion is in the second state, further wherein the secondary circuit portion is adapted to provide an indication of the sound monitored during the second state to the primary circuit portion, further wherein the system is adapted to dynamically adjust the frequency with which the primary circuit portion enters the first state based on the indication.

Thus it will be seen that by dynamically adjusting how often the first state is entered based on an indication of the sound monitored during the second state, the system has the capability to dynamically adapt its operation to better match the sound conditions encountered during the second state. This may be used, for example, to provide for an appropriate balance between accuracy and resource utilisation in a dynamic way.

In a set of embodiments, the primary circuit portion has a lower power consumption in the second state than in the first state. For example, sound could be monitored by the primary circuit portion with a high accuracy in the first state, whereas in the second state sound is monitored by the primary circuit portion with a lower accuracy.

This would allow the system to control the accuracy of monitoring and hence power consumption in dependence on the sound conditions encountered during the second state. This may be used, for example, to provide for an appropriate balance between accuracy and power consumption in a dynamic way.

The primary circuit portion could, for example, monitor sound during both the first and the second states, albeit with possibly different monitoring characteristics. This would allow the system to control the rate at which the different sets of monitoring conditions are alternated in dependence on the sound conditions encountered during the second state. In a set of embodiments, however, the primary circuit portion is adapted to monitor sound only during the first state. Such embodiments allow the system to minimize its power consumption in the second state.

The system could be provided with a signal indicative of sound level from an external source. In a set of embodiments, however, the system further comprises a microphone and the primary circuit portion is adapted to monitor sound using the microphone.

The secondary circuit portion could also use the above-mentioned microphone to monitor sound. Using a common microphone may result in cost savings or other gains. In a set of embodiments, however, the system further comprises a second microphone and the secondary circuit portion is adapted to monitor sound using the second microphone. In such embodiments the choice of the separate microphones can be tailored to the characteristics of the primary and secondary circuit portions, respectively. This may be used, for example, to optimize circuit design for each one of the circuit portions individually.

In a set of embodiments, the secondary circuit portion is arranged to monitor sound only during the second state. In an alternative set of embodiments, the secondary circuit portion is arranged to monitor sound during the first and second states. This could be useful, for example, where the primary and secondary circuit portions have different microphones as mentioned above. The microphone associated with the primary circuit portion might, for example, have a limited dynamic range such that it cannot handle sound pressure levels above say 115 dB. If the secondary circuit portion is associated with an alternative microphone type that is capable of handling peak levels 115-160 dB, it can provide useful information when the primary circuit portion is active.

The primary circuit portion could comprise, for example, a digital signal processor (DSP). This would allow for specialised signal processing to be carried out efficiently in the primary circuit portion. In a set of embodiments, however, the primary circuit portion comprises a microcontroller arranged to monitor the sound. Such embodiments can use the wide availability of microcontrollers and their programmability to their advantage. The microcontroller could, for example, carry out other tasks as well.

The secondary circuit portion could provide, for example, the output of a logic gate as the indication to the primary circuit portion. This would allow for robust communication of this indication from the secondary circuit portion to the primary circuit portion. In a set of embodiments, however, the secondary circuit portion comprises a level memory circuit portion. This could, for example, comprise or include a peak hold circuit or capacitor. The level memory circuit portion may provide an appropriate level, e.g. a state of charge of a capacitor, as the indication to the primary circuit portion. In such embodiments the secondary circuit portion can make use of the ability of such arrangements to hold a value for relatively long periods of time. This may be used, for example, to produce particularly simple and efficient designs for the secondary circuit portion.

The secondary circuit portion could monitor sound using a variety of mechanisms. In a set of embodiments, however, the secondary circuit portion is adapted to monitor sound by detecting levels above a predetermined threshold in a sound signal or by measuring the amount of time during which a sound signal exceeds a predetermined threshold. Such embodiments can make use of the fact that thresholding signals is a particularly simple operation to perform in circuits. This may be used, for example, to produce simple and efficient designs for the secondary circuit portion.

The secondary circuit portion can be a digital circuit. In a set of embodiments, however, the secondary circuit portion is an analogue circuit. In such embodiments sound monitoring is performed in the analogue domain by the secondary circuit portion. This may be used, for example, to provide for particularly simple and therefore low cost or low power designs for the secondary circuit portion.

The system could comprise components or circuitry in addition to the primary and secondary circuit portions in order to adjust the frequency with which the primary circuit portion enters the first state. In a set of embodiments, however, the primary circuit portion itself is arranged to adjust the frequency with which it enters the first state. Such embodiments do not require additional circuitry to perform this adjustment.

In a set of embodiments, the present invention provides a self-contained device comprising the system as described above and a battery, wherein the battery is adapted to power the primary and the secondary circuit portions. This may be used, for instance, to make such devices portable.

The system could be provided in a variety of devices fashioned for a multiplicity of purposes. In a set of embodiments, however, the present invention provides an earplug or a head-worn garment comprising the system as described above. In such embodiments, the system is positioned in relative proximity to the ears of the subject wearing the earplug or head-worn garment. This may be used, for example, for providing for a particularly faithful monitoring of the sound that reaches the wearer.

Certain embodiments of the present invention will now be described, by way of example only, with reference to the accompanying drawings, in which.

Figure 1:
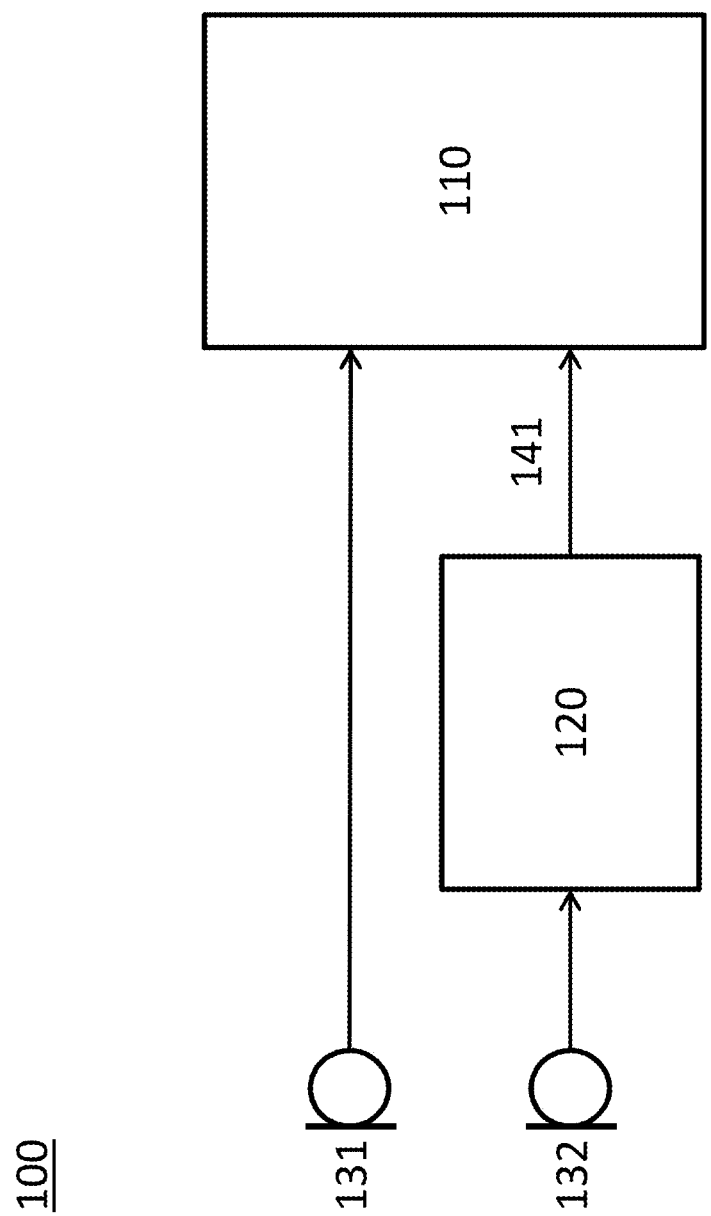
FIG. 1 shows a schematic view of a system in accordance with a first embodiment of the present invention.

FIG. 1 shows a system 100 in accordance with a first embodiment of the present invention. The system 100 comprises a primary circuit portion 110 and a secondary circuit portion 120. A first microphone 131 is connected to the primary circuit portion 110, which is adapted to monitor sound received using the first microphone. A second microphone 132 is connected to the secondary circuit portion 120, which is adapted to monitor sound received using the second microphone.

The primary circuit portion 110 in this embodiment is a microcontroller and is adapted to alternate between a first, active state of operation and a second, sleep state of operation. In the active state of operation, the microcontroller 110 monitors sound (through the use of the first microphone 131). It may for example measure the sound pressure level experienced over time so that the exposure of a user to either chronic or acute potentially harmful sounds can be tracked.

The microcontroller 110 is adapted to periodically enter the active state with a given frequency. For example, a timer circuit could be used to cause the microcontroller to alternate between the active and the sleep states of operation. Such a timer circuit could be part of the microcontroller or the secondary circuit portion or it could be a circuit separate from both circuit portions. As a further example, a software timer could be used to cause the microcontroller to alternate between the states of operation. Such a software timer could be running on the microcontroller, for instance.

When the microcontroller 110 is in the sleep state, the secondary circuit portion 120 monitors sound (through the use of the second microphone 132). The secondary circuit portion could remain active all the time or it could be activated when required—e.g. by the microcontroller 110. The secondary circuit portion 120 provides an indication of the sound monitored during the sleep state to the microcontroller 110. In the embodiment shown in FIG. 1, this indication is provided via the indication signal 141 (which could be, for example, an electrical signal). The indication signal 141 from the secondary circuit portion reflects the activity in the sound environment during the sleep state of operation. In a particularly simple example, the secondary circuit portion could merely detect the presence or absence of sound during the sleep state of operation and provide the result of that detection as the indication. The indication signal 141 could therefore be a simple flag indicating whether a particular threshold has been exceeded.

In a slightly more elaborate example, the secondary circuit portion 120 could perform an integration of the sound energy captured by the microphone 132 during the sleep state of operation and provide the result as the indication signal 141.

In another example, the secondary circuit portion 120 could detect sound peaks above a threshold in the microphone signal during the sleep state of operation and report their number, duration or other parameters as the indication signal 141. In a further example, the secondary circuit portion 120 could measure the amount of time during which the microphone signal exceeds a threshold during the sleep state of operation and report this duration as the indication signal 141.

An example of one possible operation of the secondary circuit portion is described below with reference to FIG. 3.

The microcontroller 110 is typically able to monitor sound with a relatively high accuracy. For example, it may sample and store a digital representation of the sound from the first microphone 131, to allow analysis of its frequency spectrum and to track changes in this and amplitude levels over time. Since such sampling and analysis is relatively power intensive, the microcontroller goes into a sleep state periodically to save power and sound monitoring is carried out with the less sophisticated and so lower power secondary circuit. Based on the indication 141 from the secondary circuit portion 120, the microcontroller 110 adjusts the frequency with which the microcontroller 110 enters the active state of operation. This may help to ensure that an appropriate balance is struck between power saving and adequate sound monitoring performance. Using the indication 141 signal, the microcontroller 110 could increase the frequency with which the active state of operation is entered if the indication from the secondary circuit portion suggests that the activity in the sound environment has exceeded a first threshold or simply if the sound environment has become more active than it previously was (thus requiring more frequent high-accuracy monitoring). Similarly, the microcontroller could decrease the frequency if the indication suggests that the activity in the sound environment is below a second threshold or simply if the environment has become less active than it previously was (thus requiring less frequent high-accuracy monitoring). As will be apparent, such a system will dynamically adapt its behaviour to the prevailing conditions in the sound environment. Such a system will use the high-accuracy, high-power monitoring (the active state of operation) more frequently in environments that are more active and will use the high-accuracy, high-power monitoring less frequently in less active environments. As will be apparent, in such a system 100 there is always however at least one circuit portion that is monitoring sound at any given time. The system can thus monitor sound without interruption.

Figure 2:
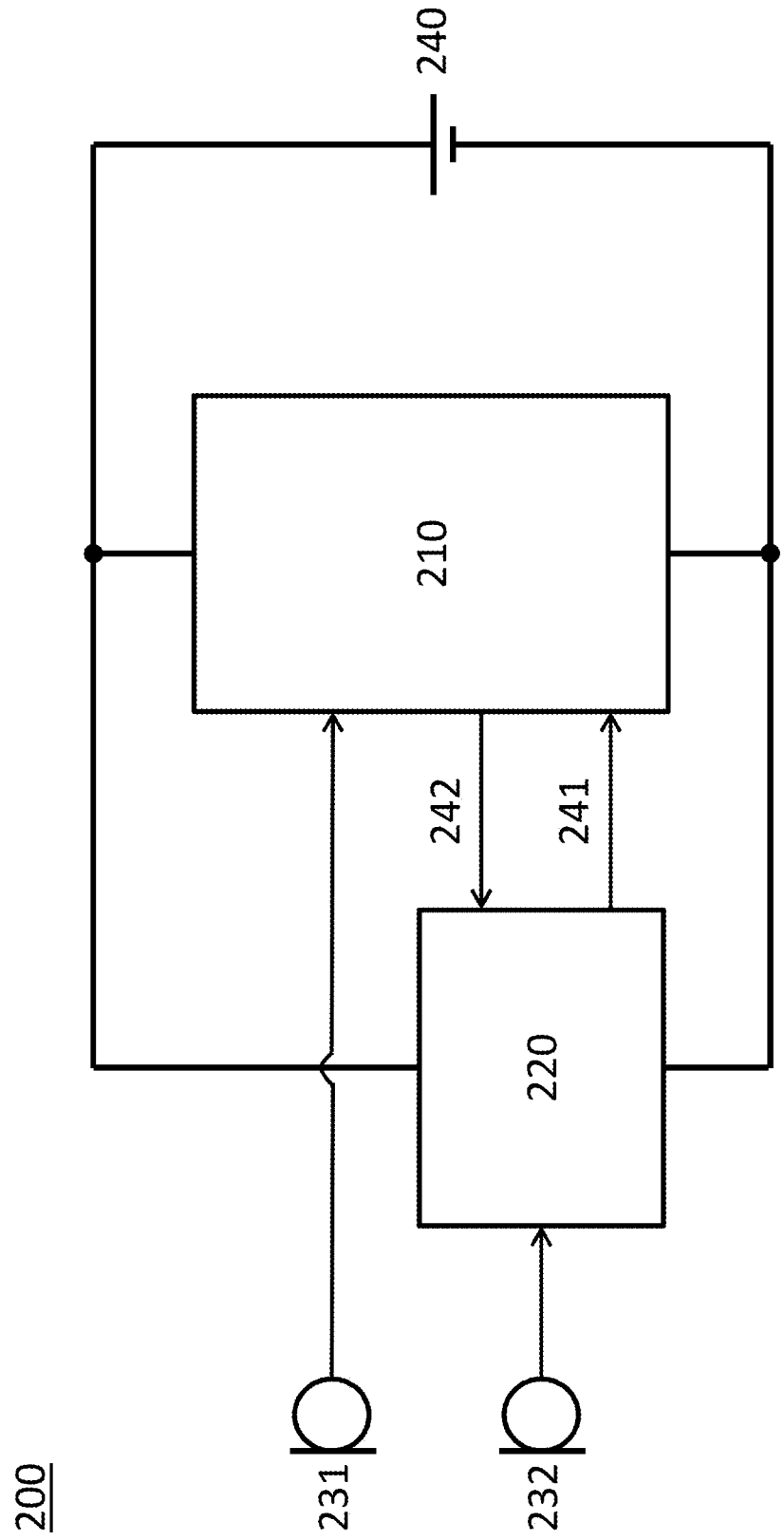
FIG. 2 shows a schematic view of a system in accordance with a second embodiment of the present invention.

FIG. 2 shows a schematic view of a system 200 in accordance with a second embodiment of the present invention. This system 200 also comprises a primary circuit portion in the form of a microcontroller 210 and a secondary circuit portion 220, described in more detail with ref to FIG. 3, with corresponding microphones 231, 232. The secondary circuit provides an indication signal 241 to the microcontroller 210 as before, but in this embodiment it also receives a rest signal 242 from the microcontroller 210. The power source, for example, a battery 240, which powers the microcontroller 210 and the secondary circuit portion 220 is also shown.

Figure 3:
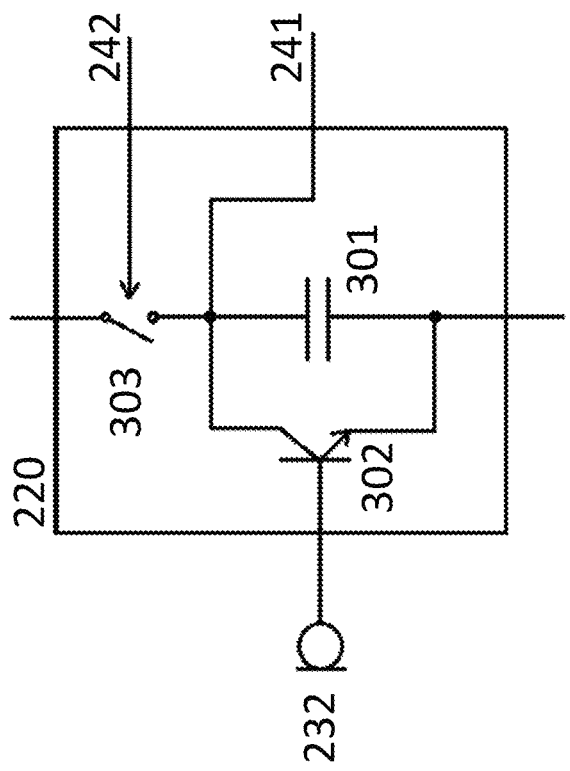
FIG. 3 shows a conceptual schematic of the secondary circuit portion of FIG. 2.

FIG. 3 shows a more detailed schematic of the secondary circuit portion 220 of FIG. 2. Only the key components thereof are shown and thus some discrete components are omitted for clarity. The secondary circuit portion 220 includes a capacitor 301, a transistor 302 in parallel with the capacitor and a switch 303. The gate or base of the transistor 302 is connected to the microphone 232.

The indication signal 241 is an electrical signal that reflects the state of charge of the capacitor 301. As mentioned in the context of FIG. 2, there is a reset signal 242 input to the circuit 220. The microcontroller 210 asserts the reset signal 242 when it is in an active state of operation. This will lead to the switch 303 being closed and so the capacitor 301 will be charged by the power source 240 up to the voltage of the power source 240.

Whenever the sleep state of operation is entered and the microcontroller 210 pulls the reset line 242 low, the switch 303 is caused to open and hence the capacitor 301 will be disconnected from the power source 240. The transistor 302 receives a bias signal from the microphone 232. Whenever the microphone signal exceeds a specific threshold (the threshold for the transistor 302 to switch to conduction) the capacitor 301 will progressively discharge through the transistor 302. However the capacitor 301 will not discharge if the signal from the microphone 232 is below the threshold voltage of the transistor 302.

As will be appreciated therefore, the indication signal 241 at the end of any one instance of the sleep state of operation provides an indication, in the form of the voltage across the capacitor 301, of the amount of time during which the signal from the microphone 232 exceeded the threshold. In other words, this indication will be reflective of the level of activity in the sound environment during the sleep state of operation.

As will be recognised, the conceptual schematic of FIG. 3 is very simple to implement but is merely one example of how a secondary circuit portion for a system in accordance with the invention could be constructed. In essence, any circuit portion that is able to provide an indication of the sound monitored during the sleep state of operation to the microcontroller could be used for this purpose. As mentioned above, such indications may be as simple as an indication of the presence or absence of sound during the sleep state of operation, or they could rely on more elaborate processing of the microphone signal.

Returning to FIG. 2, as in the first embodiment the microcontroller 210 is adapted to alternate between an active state of operation and a sleep state of operation. In the active state of operation, the microcontroller 210 monitors sound (through the first microphone 231). The microcontroller 210 is adapted to periodically enter the sleep state with a given frequency.

When the microcontroller 210 is in the sleep state, the secondary circuit portion 220 monitors sound as described above. The voltage on the indicator signal 241 provides an indication of the sound monitored during sleep state to the microcontroller 210.

Based on the indication as provided via the indication signal 241, the microcontroller adjusts the frequency with which the microcontroller 210 enters the active state of operation.

The reset signal 242 is used by the microcontroller 210 to reset the secondary circuit portion 220 to a defined state (by recharging the capacitor 301 to the battery voltage. The microcontroller 210 is programmed such that every time that it enters the active state of operation, the microcontroller 210 will read the indication signal 241 and subsequently reset the secondary circuit portion 220 using the reset signal 242. As a consequence of this reset, the secondary circuit portion 220 will start its sound monitoring anew every time the microcontroller enters the sleep state of operation.

A system of the present invention can be comprised in a self-contained device that also contains a power source, such as a battery, that is adapted to power the primary and the secondary circuit portions. The sound monitoring functionality provided by the systems of the present invention can thus be part of self-contained portable devices.

Figure 4:
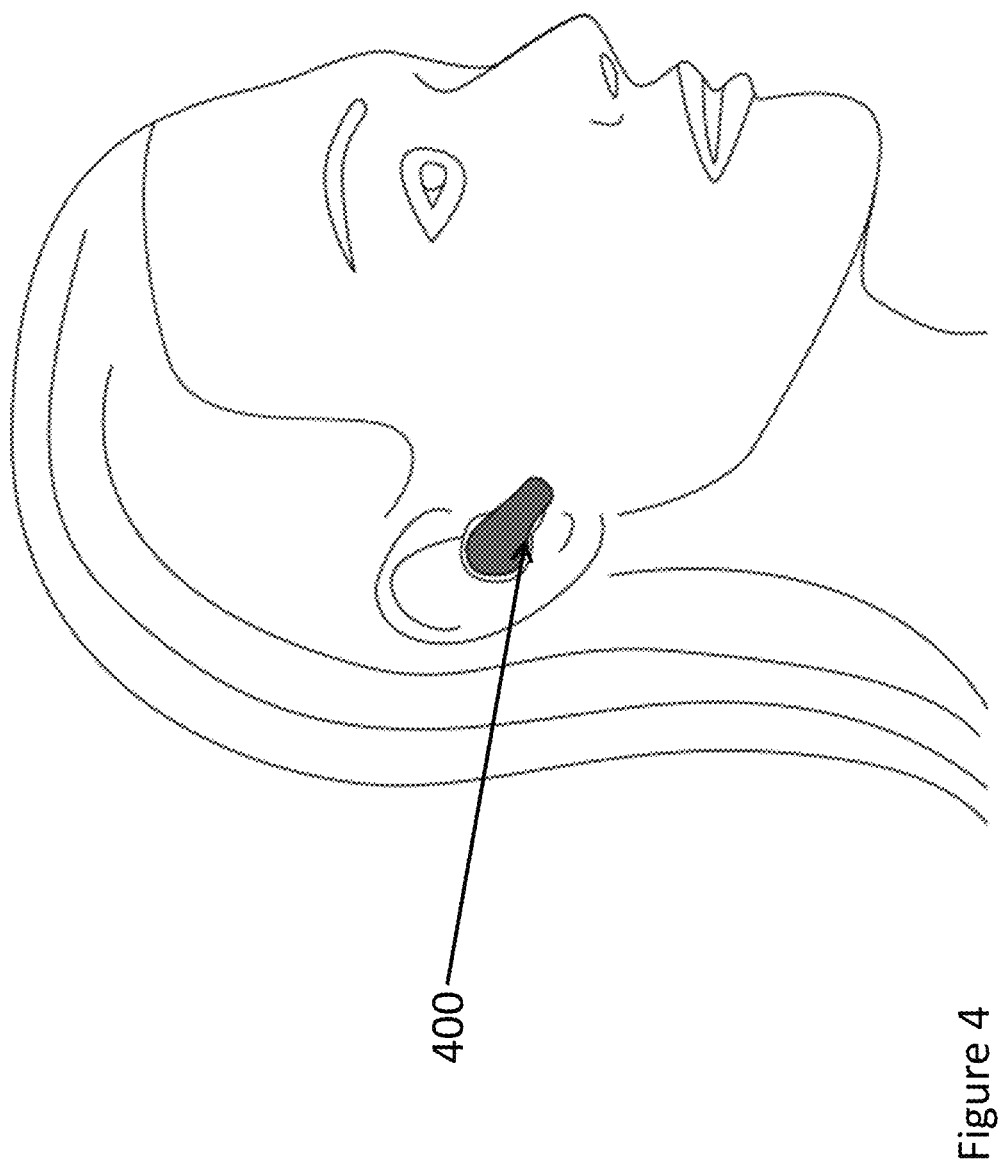
FIG. 4 shows an example of an earplug.

A system of the present invention can also be comprised in an earplug or a head-worn garment. An example of such an earplug 400 is shown in FIG. 4. This is a self-contained device containing a battery and the necessary components to provide the sound monitoring functionality provided by embodiments of the present invention, for example those described above. Such earplugs or head-worn garments can advantageously be used for monitoring a person's exposure to sound for the purposes of ensuring that this exposure stays within comfortable, healthy and safe limits. Of course the skilled person will appreciate that such embodiments which are secured to a user's head could take many different forms such as headphones, earmuffs, hats etc.

The invention claimed is:

1. A system for monitoring sound, comprising a primary circuit portion, and a secondary circuit portion, wherein the primary circuit portion is adapted to alternate between a first state of operation and a second state of operation, wherein, in the first state, the primary circuit portion is adapted to monitor sound, and wherein the primary circuit portion is adapted to periodically enter the first state with a predetermined frequency, further wherein the secondary circuit portion is adapted to monitor sound while the primary circuit portion is in the second state, further wherein the secondary circuit portion is adapted to provide an indication of the sound monitored during the second state to the primary circuit portion, further wherein the system is adapted to dynamically adjust the frequency with which the primary circuit portion enters the first state based on the indication.

2. The system as claimed in claim 1, wherein the primary circuit portion has a lower power consumption in the second state than in the first state.

3. The system as claimed in claim 1, wherein the primary circuit portion is adapted to monitor sound only during the first state.

4. The system as claimed in-claim 1, further comprising a microphone, wherein the primary circuit portion is adapted to monitor sound using the microphone.

5. The system as claimed in claim 1, further comprising a second microphone, wherein the secondary circuit portion is adapted to monitor sound using the second microphone.

6. The system as claimed in claim 1, wherein the secondary circuit portion is arranged to monitor sound only during the second state.

7. The system as claimed in claim 1, wherein the secondary circuit portion is arranged to monitor sound during the first and second states.

8. The system as claimed in claim 1, wherein the primary circuit portion comprises a microcontroller arranged to monitor the sound.

9. The system as claimed in claim 1, wherein the secondary circuit portion comprises a level memory circuit portion.

10. The system as claimed in claim 9, wherein the level memory circuit portion comprises a capacitor and a state of charge of the capacitor is provided as the indication to the primary circuit portion.

11. The system as claimed in claim 1, wherein the secondary circuit portion is adapted to monitor sound by detecting levels above a predetermined threshold in a sound signal.

12. The system as claimed in claim 1, wherein the secondary circuit portion is adapted to monitor sound by measuring an amount of time during which a sound signal exceeds a predetermined threshold.

13. The system as claimed in claim 1, wherein the secondary circuit portion is an analogue circuit.

14. The system as claimed in claim 13, wherein sound monitoring is performed in the analogue domain by the secondary circuit portion.

15. The system as claimed in claim 1, wherein the primary circuit portion is arranged to adjust the frequency with which it enters the first state.

16. A self-contained device comprising:
the system as claimed in claim 1; and
a battery, wherein the battery is adapted to power the primary and the secondary circuit portions.

17. An earplug comprising the device as claimed in claim 16, wherein the system is positioned in relative proximity to the ears of the subject wearing the earplug.

18. A head-worn garment comprising the device as claimed in claim 16, wherein the system is positioned in relative proximity to the ears of the subject wearing the head-worn garment.

19. An earplug comprising the system as claimed in claim 1, wherein the system is positioned in relative proximity to the ears of the subject wearing the earplug.

20. A head-worn garment comprising the system as claimed in claim 1, wherein the system is positioned in relative proximity to the ears of the subject wearing the head-worn garment.

* * * * *